US007926600B2

(12) United States Patent
Flynn et al.

(10) Patent No.: US 7,926,600 B2

(45) Date of Patent: Apr. 19, 2011

(54) VEHICLE LEVELING AND ATTITUDE POSITIONING SYSTEM

(75) Inventors: Charles Lee Flynn, Davisburg, MI (US); Christopher E. Curtis, Shelby Township, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 295 days.

(21) Appl. No.: 12/255,836

(22) Filed: Oct. 22, 2008

(65) Prior Publication Data

US 2010/0096819 A1 Apr. 22, 2010

(51) Int. Cl.
*B60S 9/00* (2006.01)

(52) U.S. Cl. ...... 180/41; 280/6.15; 280/6.153; 254/418; 254/425

(58) Field of Classification Search .................... 180/41; 280/6.15, 6.153, 763.1; 701/36, 37; 254/418, 254/423, 424, 425
See application file for complete search history.

(56) References Cited

U.S. PATENT DOCUMENTS

| | | | | |
|---|---|---|---|---|
| 4,746,133 | A * | 5/1988 | Hanser et al. | 280/6.153 |
| 5,143,386 | A | 9/1992 | Uriarte | |
| 5,350,983 | A * | 9/1994 | Miller et al. | 318/400.08 |
| 5,913,525 | A * | 6/1999 | Schneider et al. | 280/6.153 |
| 6,584,385 | B1 | 6/2003 | Ford et al. | |
| 6,885,924 | B2 | 4/2005 | Ford et al. | |
| 7,226,057 | B2 * | 6/2007 | Eichhorn et al. | 280/6.153 |
| 7,389,994 | B2 * | 6/2008 | Trudeau et al. | 280/6.153 |
| 7,407,189 | B2 * | 8/2008 | Hiebert et al. | 280/766.1 |
| 7,617,018 | B2 * | 11/2009 | Ford et al. | 700/279 |
| 7,621,538 | B2 * | 11/2009 | Nordmeyer et al. | 280/5.515 |
| 2009/0189134 | A1 * | 7/2009 | Ford et al. | 254/418 |
| 2010/0176359 | A1 * | 7/2010 | Wisner | 254/425 |

OTHER PUBLICATIONS

Atwood, Literature No. MPD 66166, Levelegs System, Installation•Operation•Maintenance brochure, 12 pages, Sep. 27, 2004.

* cited by examiner

*Primary Examiner* — Ruth Ilan

(74) *Attorney, Agent, or Firm* — Dickenson Wright PLLC; Richard A. Jones; Dean B. Watson

(57) ABSTRACT

A vehicle leveling assembly includes a plurality of jack assemblies corresponding to four quadrants of a vehicle, and a plurality of sensors for determining jack position and rate of movement. A method of detecting contacting between the shafts of the jack assemblies and the ground includes measuring pulse width of current emitted by the hall effect sensor to monitor the speed of the shafts and recognizing contact with the ground when the shaft slows down. A method of detecting contacting between the shafts of the jack assemblies and the ground includes measuring the electric motor current signal and correlating a pulse from the current signal to the electric motor revolutions per minute and travel of the shafts. A method of calibrating the leveling assembly includes measuring a change in inclination as the jack assemblies are extended a known distance to determine the distance between the jack assemblies. A method of leveling includes extending the shafts an additional compacting distance to ensure accurate calculations of shaft extension, prior to attempting to level the vehicle.

21 Claims, 7 Drawing Sheets

A C 26 20 34 24 B 32 30 D 28 38 36 22

20
24
26
68
Gear Box
Actuator Assembly
42
Integrated Position Sensor
44
40
ECU
OPERATION INTERFACE ECU
CAN
CAN LOW
CAN HIGH
64
34
56
68
Gear Box
Integrated Position Sensor
54
Actuator Assembly
32
ECU
52
166
Inclination Sensor Assembly
28
30
68
Gear Box
Actuator Assembly
48
Integrated Position Sensor
50
46
ECU
38
36
68
Gear Box
Integrated Position Sensor
62
60
Actuator Assembly
ECU
58

VEHICLE LEVELING AND ATTITUDE POSITIONING SYSTEM

BACKGROUND OF THE INVENTION

1. Field of the Invention

The subject invention relates generally to a vehicle leveling assembly and methods for operating the vehicle leveling assembly.

2. Description of the Prior Art

Known vehicle leveling assemblies, including leveling assemblies for recreational vehicles, use a plurality of jack assemblies and an inclination sensor assembly attached to a vehicle structure. The jack assemblies each include an actuator assembly for translating a shaft along an axis to adjust vehicle attitude. For example, U.S. Pat. Nos. 6,584,385, and 6,885,924, both issued to Ford et al., disclose the use of inclination sensor data and adjustable jack assemblies.

SUMMARY OF THE INVENTION AND ADVANTAGES

The invention provides for a vehicle leveling assembly including a plurality of jack assemblies for attachment to a vehicle structure. The jack assemblies include a shaft extending along an axis, and an actuator assembly for translating the shaft along the axis. The jack assemblies also include an integrated position sensor for measuring a rate of movement of the shaft along the axis.

The invention also provides a method of detecting contact with the ground including determining an operating speed of the actuator assembly, monitoring the operating speed, and stopping the actuator assembly when the operating speed decreases to indicate that an end of the shaft is in contact with the ground.

The invention also provides a method of calibration including calculating a front-rear distance between the shafts and a left-right distance between the shafts based on measuring a change in inclination over a known calibration extension distance.

The invention also provides a method of leveling a vehicle including activating the actuator assemblies to lower the shafts downwardly into contact with the ground beneath the vehicle. The plurality of actuator assemblies are then activated again, to lower the shafts an additional compacting distance. One of the shafts corresponding to a corner of the vehicle is defined as a highest shaft by measuring a front-rear inclination of the vehicle and a left-right inclination of the vehicle. For each remaining shaft other than the highest shaft a necessary extension distance is determined as the distance that the remaining shafts will be moved based on at least one of the front-rear inclination and the left-right inclination of the vehicle. The actuator assemblies corresponding to the remaining shafts are activated to move the remaining shafts the necessary extension distances to level the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
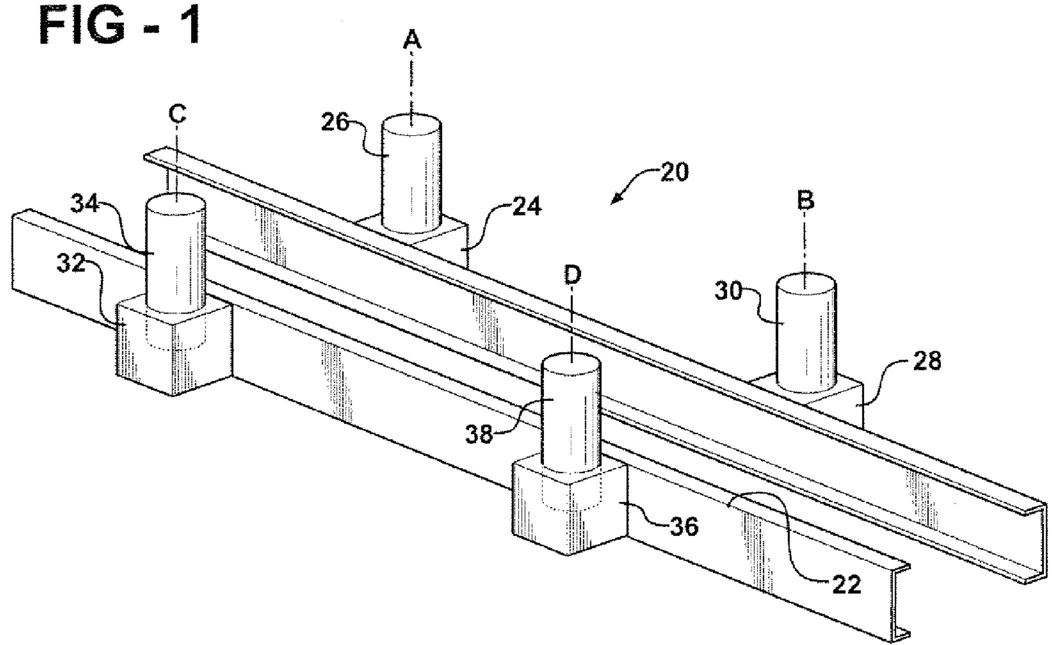
FIG. 1 is a perspective view of a portion of a vehicle structure inverted with four jack assemblies and shafts extending upwardly away from the vehicle structure.

Referring to the Figures, wherein like numerals indicate corresponding parts throughout the several views, a vehicle leveling assembly is generally indicated at 20. Referring first to FIG. 1, the vehicle leveling assembly 20 is shown as being attached to a vehicle structure 22. For convenience, the vehicle structure 22 is shown in isolation without other chassis components, and is inverted to more easily display the vehicle leveling assembly 20. A first jack assembly 24 is attached to the vehicle structure 22 in a first quadrant, corresponding to a front-left quadrant of the vehicle (not shown). The first quadrant also corresponds with a driver's side of a left-side drive vehicle. The first jack assembly 24 includes a first shaft 26 translatable about a first axis A relative to the vehicle structure 22. A second jack assembly 28 is attached to the vehicle structure 22 in a second quadrant disposed rearwardly of the first quadrant, corresponding to a rear-left quadrant of the vehicle (not shown). The second jack assembly 28 includes a second shaft 30 translatable about a second axis B relative to the vehicle structure 22. A third jack assembly 32 is attached to the vehicle structure 22 in a third quadrant disposed rightwardly of the first quadrant, corresponding to a front-right quadrant of the vehicle (not shown). The third jack assembly 32 includes a third shaft 34 translatable about a third axis C relative to the vehicle structure 22. A fourth jack assembly 36 is attached to the vehicle structure 22 in a fourth quadrant disposed rightwardly of the second quadrant, corresponding to a rear-right quadrant of the vehicle (not shown). The fourth jack assembly 36 includes a fourth shaft 38 translatable about a fourth axis D relative to the vehicle structure 22.

Figure 2:
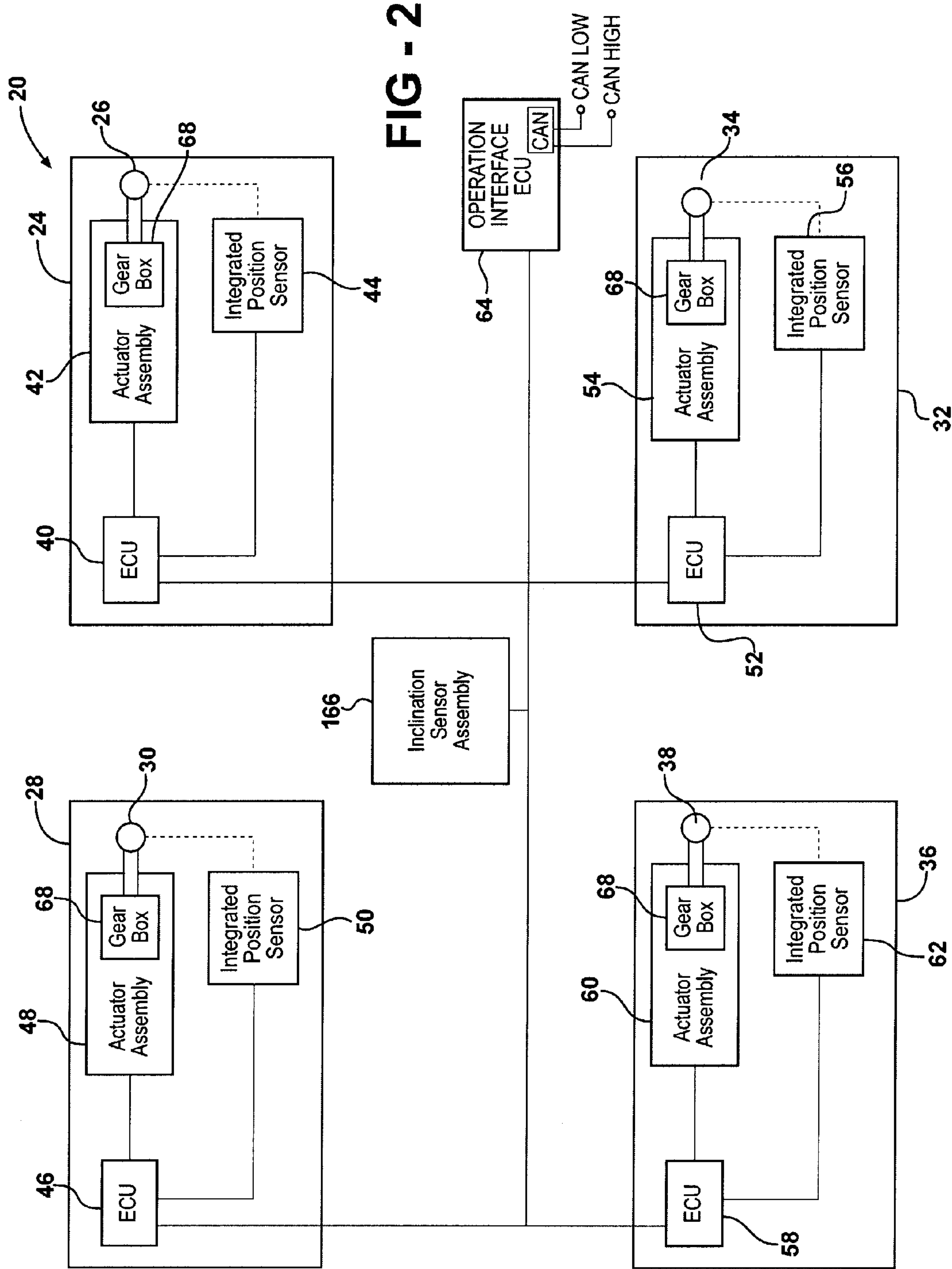
FIG. 2 is a system diagram of a vehicle leveling assembly according to an exemplary embodiment of the present invention.

Additional detail of the jack assemblies 24, 28, 32, 36 is provided, with reference to the system diagram of FIG. 2. The single solid lines connecting elements in FIG. 2 represent electrical connection, whereas the double solid lines in FIG. 2 represent mechanical connection. The first jack assembly 24 includes a first electronic control unit 40 electrically connected to a first actuator assembly 42 and a first integrated position sensor 44. The second jack assembly 28 includes a second electronic control unit 46 electrically connected to a second actuator assembly 48 and a second integrated position sensor 50. The third jack assembly 32 includes a third electronic control unit 52 electrically connected to a third actuator assembly 54 and a third integrated position sensor 56. The fourth jack assembly 36 includes a fourth electronic control unit 58 electrically connected to a fourth actuator assembly 60 and a fourth integrated position sensor 62. The integrated position sensors 44, 50, 56, 62 provide a signal to the electronic control units 40, 46, 52, 58 to allow the electronic control units 40, 46, 52, 58 to determine position, velocity and acceleration of the shafts 26, 30, 34, 38 along the axes A, B, C, D and that signal is received by the electronic control units 40, 46, 52, 58 via the electrical connection. The electronic control units 40, 46, 52, 58 are all electrically connected to a leveling system electronic control unit 64, which is provided to receive and transmit instructions from an operator interface electronic control unit 66 as described herein.

The leveling system electronic control unit 64 is in communication with the electronic control units 40, 46, 52, 58 through a serial interface such as a LIN, CAN or any other known serial interface. Additionally, the actuator assemblies 42, 48, 54, 60 are independently responsive to the electronic control units 40, 46, 52, 58. The leveling system electronic control unit 64 is in communication with the operator interface control unit 66 which is configured to receive a vehicle status signal from a vehicle bus system, such as an RV-CAN bus system. Alternatively, the leveling system electronic control unit 64 may be directly connected to the RV-CAN bus system. The vehicle status signal may be a vehicle transmission status, parking break engagement, foot break engagement, or an ignition status. Alternatively, however, the vehicle leveling system 20 could be directly wired to individual assemblies within the vehicle structure 22 to receive such vehicle status information.

The leveling system electronic control unit 64 is provided with the vehicle leveling assembly 20 to determine a front-rear inclination $\theta_1$ of the vehicle and a left-right inclination $\theta_2$ of the vehicle. The leveling system electronic control unit 64 uses a dual axis inclination sensor. Alternatively, however, two single axis inclination sensors could be used, with one measuring the front-rear inclination $\theta_1$, and the other measuring the left-right inclination $\theta_2$. In addition, the leveling system electronic control unit 64 uses a two-axis micro-electro-mechanical tilt sensor. As the inclination of the vehicle changes, the signal emitted by the sensor is altered, allowing the leveling system electronic control unit 64 to read the angle of inclination. Alternative types of tilt sensors include electrolytic fluid sensors, capacitive sensors, and pendulum type sensors.

Figure 3:
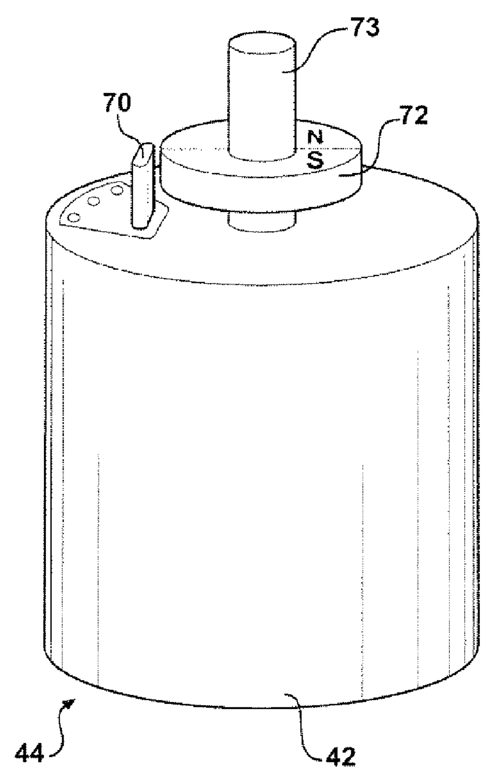
FIG. 3 is a perspective view of an integrated position sensor according to the exemplary embodiment.

Referring to FIG. 2, the actuator assemblies 42, 48, 54, 60 have an electric motor generating rotational motion and being mechanically connected to a gearbox 68. The gears within the gearbox 68 are mechanically connected to the shafts 26, 30, 34, 38 and convert the rotational motion of the electric motor into linear motion to drive the shafts 26, 30, 34, 38. As shown in FIG. 3, the first integrated position sensor 44 includes a hall effect sensor 70 positioned in proximity to a magnet 72. Although only the first integrated position sensor 44 is shown in FIG. 3, it should be understood that the second, third and fourth integrated position sensors 50, 56, 62 include the same structure. The magnet 72 is placed on a rotating shaft 73 of the first actuator assembly 42. The hall effect sensor 70 is a type of transducer that produces a variable output signal in response to changes in magnetic field density. Therefore, as the magnet 72 rotates, the polarity causes the magnetic field relative to the hall effect sensor 70 to change in cyclic fashion. The hall effect sensor 70 produces a pulse of current in response to rotation of the magnet 72. The electronic control units 40, 46, 52, 58 are in communication with the integrated position sensors 44, 50, 56, 62 for detecting the pulses of current emitted by the hall effect sensor 70 to determine the position of the shafts 26, 30, 34, 38. The electronic control units 40, 46, 52, 58 are also configured to measure the pulse width to determine the rate of movement of the shafts 26, 30, 34, 38. The electronic control units 40, 46, 52, 58 communicate with the actuator assemblies 42, 48, 54, 60 to stop the actuator assemblies 42, 48, 54, 60 when the rate of movement decreases. The decreasing rate of movement indicates that the shaft has contacted the ground.

It should be understood that the use of the integrated position sensors 44, 50, 56, 62 may be replaced by other known detection devices such as a commutator pulse detection circuit. If a commutator pulse detection circuit is used, the integrated position sensors are not installed with electric motors. Instead, with the commutator pulse detection circuit, the electric motor current is measured by each corresponding electronic control unit 40, 46, 52, 58. The motor current is conditioned and contains a pulse created as the magnetic field collapses in the rotor coil between two commutator segments. The time between the pulses is correlated to the electric motor revolutions per minute and the actuator travel similar to the hall effect sensor.

Figure 4:
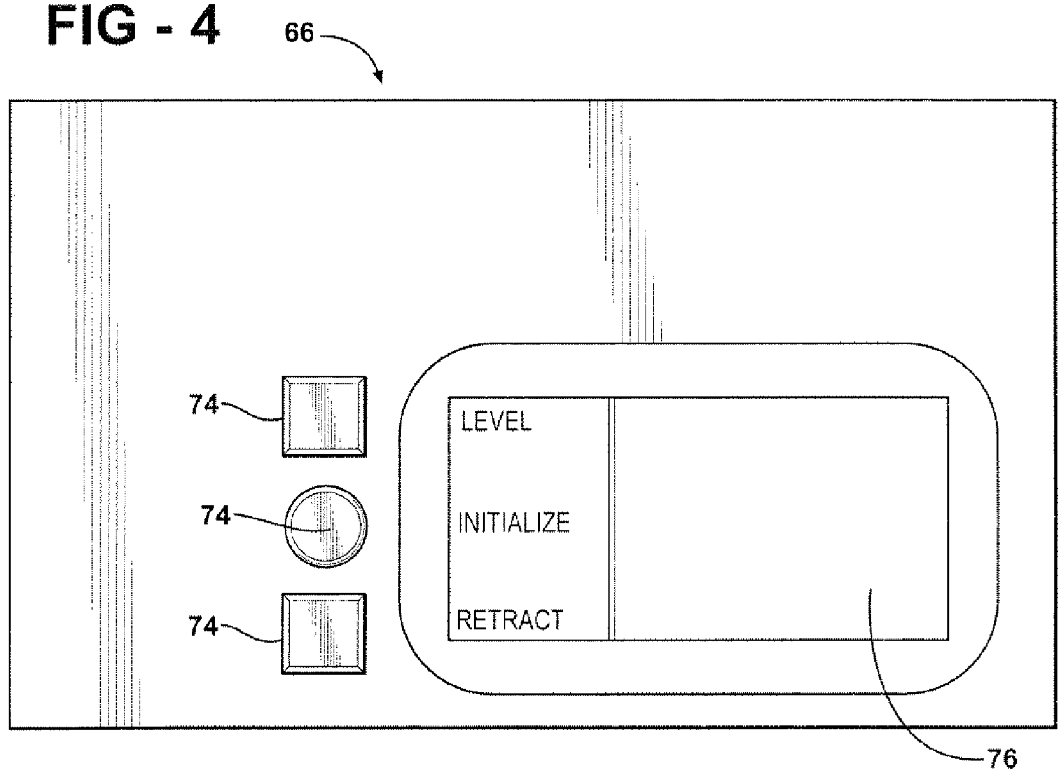
FIG. 4 is an example of an operator interface showing a first dynamic view.
Figure 5:
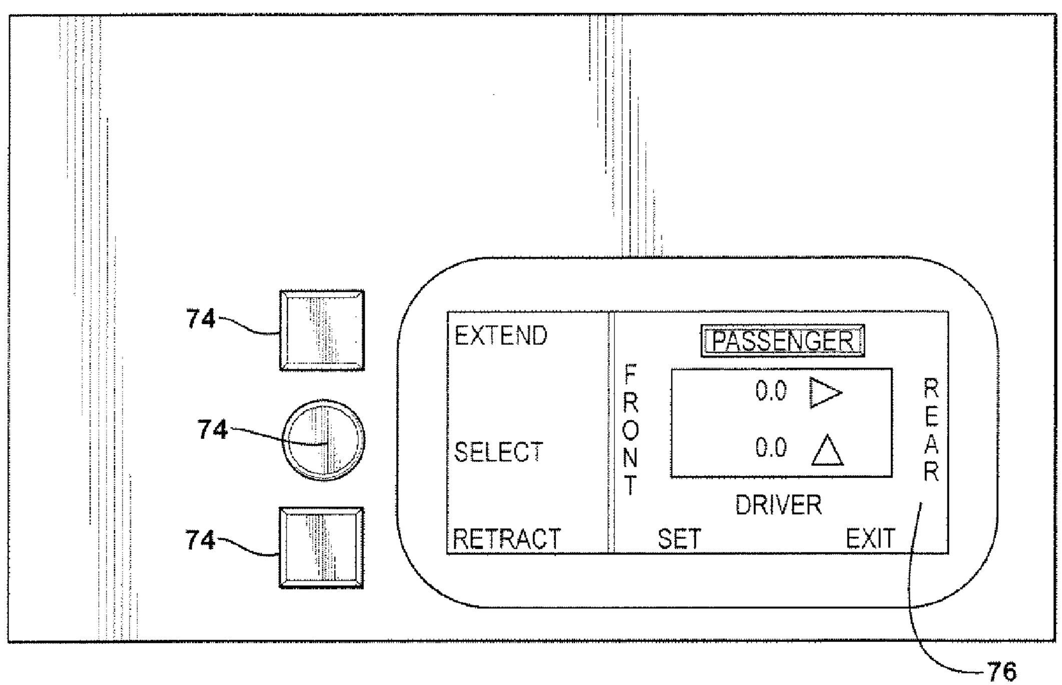
FIG. 5 is an example of the operator interface showing a second dynamic view.

Referring to FIGS. 4 and 5, the operator interface control unit 66 is shown and includes a plurality of soft-keys 74 and a liquid-crystal display 76. An operator may input instructions via the soft-keys 74, defined by the labels shown on the liquid-crystal display 76 in a plurality of dynamic views. The functions corresponding to the soft-keys 74 are defined by control logic of the operator interface control unit 66 so that the same soft-keys 74 can initiate different functions based on the labels shown in the corresponding liquid-crystal display 76, allowing for soft-key 74 functions to be redefined as the tasks change. In the present example, a first dynamic view is shown on the display in FIG. 4, where the three soft-keys 74 correspond to functions labeled "Level", "Initialize" and "Retract", respectively. If the operator were to press the soft-key 74 adjacent to the label marked "Level", the operator interface control unit 66 would initiate a vehicle leveling method, described in more detail later. Similarly, if the operator were to press the soft-key 74 adjacent to the label marked "Retract", the operator interface control unit 66 would send a command to the leveling system electronic control unit 64 to cause the leveling system control unit to communicate with the electronic control units 40, 46, 52, 58 to retract all four of the shafts 26, 30, 34, 38. If the operator were to press the soft-key 74 adjacent to the label marked "Initialize", the dynamic view would change to a second dynamic view, shown in FIG. 5. The second dynamic view includes three new labels for the soft-keys 74, including "Extend", "Select" and "Retract", respectively. These new labels could relate, for example, to manual operation of the vehicle leveling assembly 20, as opposed to an automated operation. In addition, the liquid-crystal display 76 includes additional information regarding which of the four jack assemblies 24, 28, 32, 36 is currently being controlled. The liquid-crystal display 76 can also be used by the vehicle leveling system 20 to convey information to the operator, such as a necessary warning message advising the operator not to engage in specified activity. Finally, the operator interface control unit 66 could also include a diagnostic mode accessible by manufacturers and dealers seeking to service or repair the vehicle leveling system 20. It should be understood that the operator interface control unit 66 may be configured or designed in many various ways including, for example, a vacuum florescent, OLED, plasma or cathode ray tube may be used instead of the liquid-crystal display.

Figure 6:
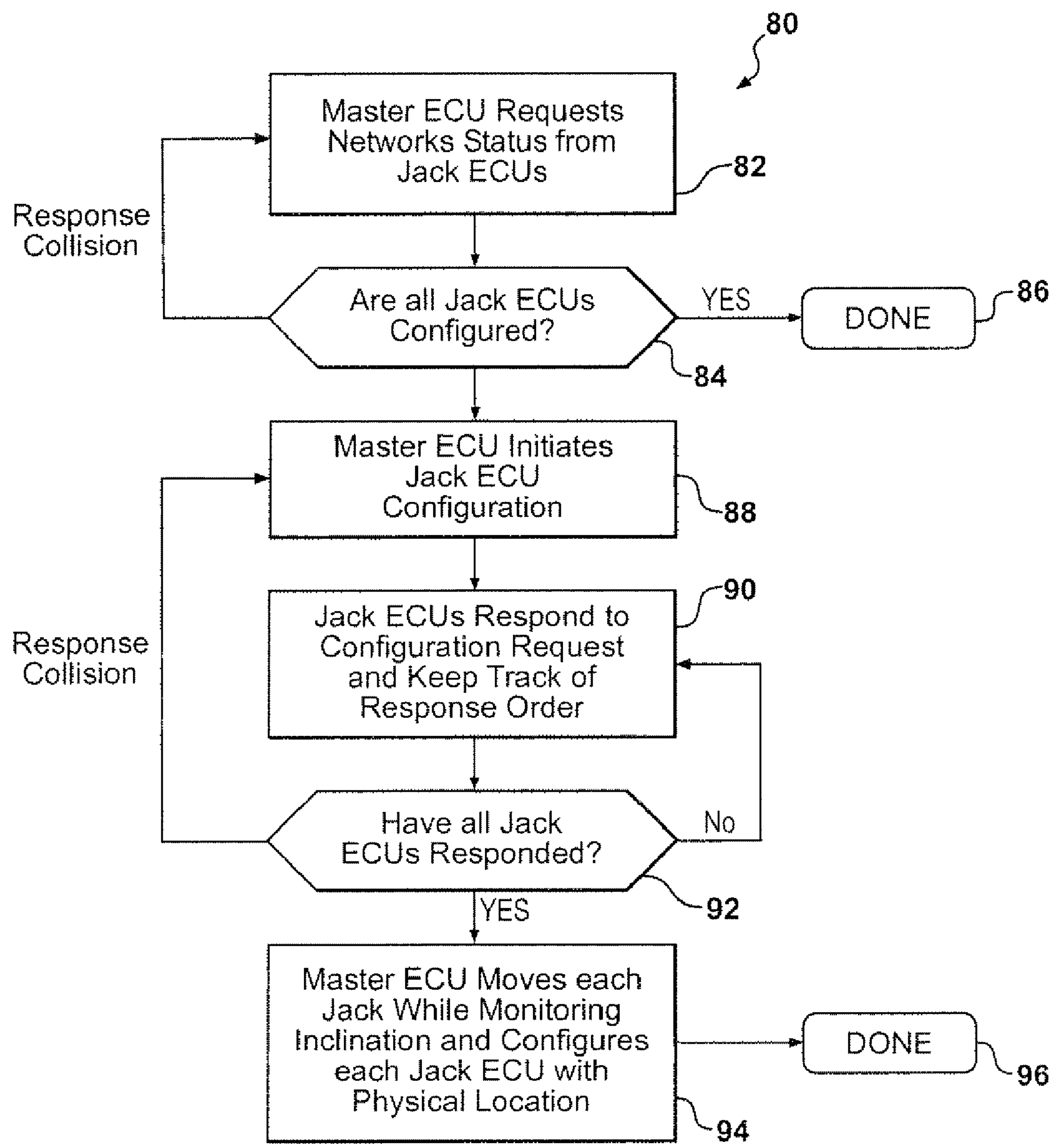
FIG. 6 is a flow-chart showing an exemplary method of configuring an electronic control unit.

One of the functions, shown in FIG. 6, includes a method of configuring a vehicle leveling assembly 20, generally shown at 80. At step 82, the operator interface control unit 66 requests a network status from each one of the electronic control units 40, 46, 52, 58 via the leveling system control unit 64 and receives responses indicating whether the electronic control units 40, 46, 52, 58 have been configured. The responses for configured electronic control units 40, 46, 52, 58 will contain a unique physical identification and will be transmitted after a specified delay. The responses for unconfigured electronic control units 40, 46, 52, 58 will inform the operator interface control unit 66 of that status, and will be transmitted in a random manner to prevent response collisions on the network.

At step 84, the responses are interpreted to determine if any of the electronic control units 40, 46, 52, 58 are previously configured. If all electronic control units 40, 46, 52, 58 are configured, the method 80 will proceed to step 86 and terminate. If a response collision is detected, the method 80 will return to step 82 and re-request the network status. If one or more of the electronic control units 40, 46, 52, 58 are not configured, the method 80 will proceed to step 88.

At step 88, the leveling system electronic control unit 64 will initiate the specific configuration process, and will first clear any previous configuration of the electronic control units 40, 46, 52, 58. Next, the responses from the cleared electronic control units 40, 46, 52, 58 will be received randomly. At step 90, each electronic control unit is assigned a temporary physical identifier based on the order of responses received. At step 92, the method 80 will verify that all electronic control units 40, 46, 52, 58 have responded. If they have not, the method 80 will return to step 92. If a response collision is detected, the method 80 will return to step 88.

At step 94, the first jack assembly 24 is extended. A measurement, such as the angle of inclination resulting from the extension, is received from the inclination sensor. This measurement is interpreted to determine the physical location of the first jack assembly 24. The first electronic control unit 40 is assigned a first permanent physical identifier associated with that location. Step 94 is repeated for each of the second, third and fourth jack assemblies 28, 32, 36. Once all jack assemblies 24, 28, 32, 36 are configured, the exemplary method proceeds to step 96 and terminates.

Figure 7:
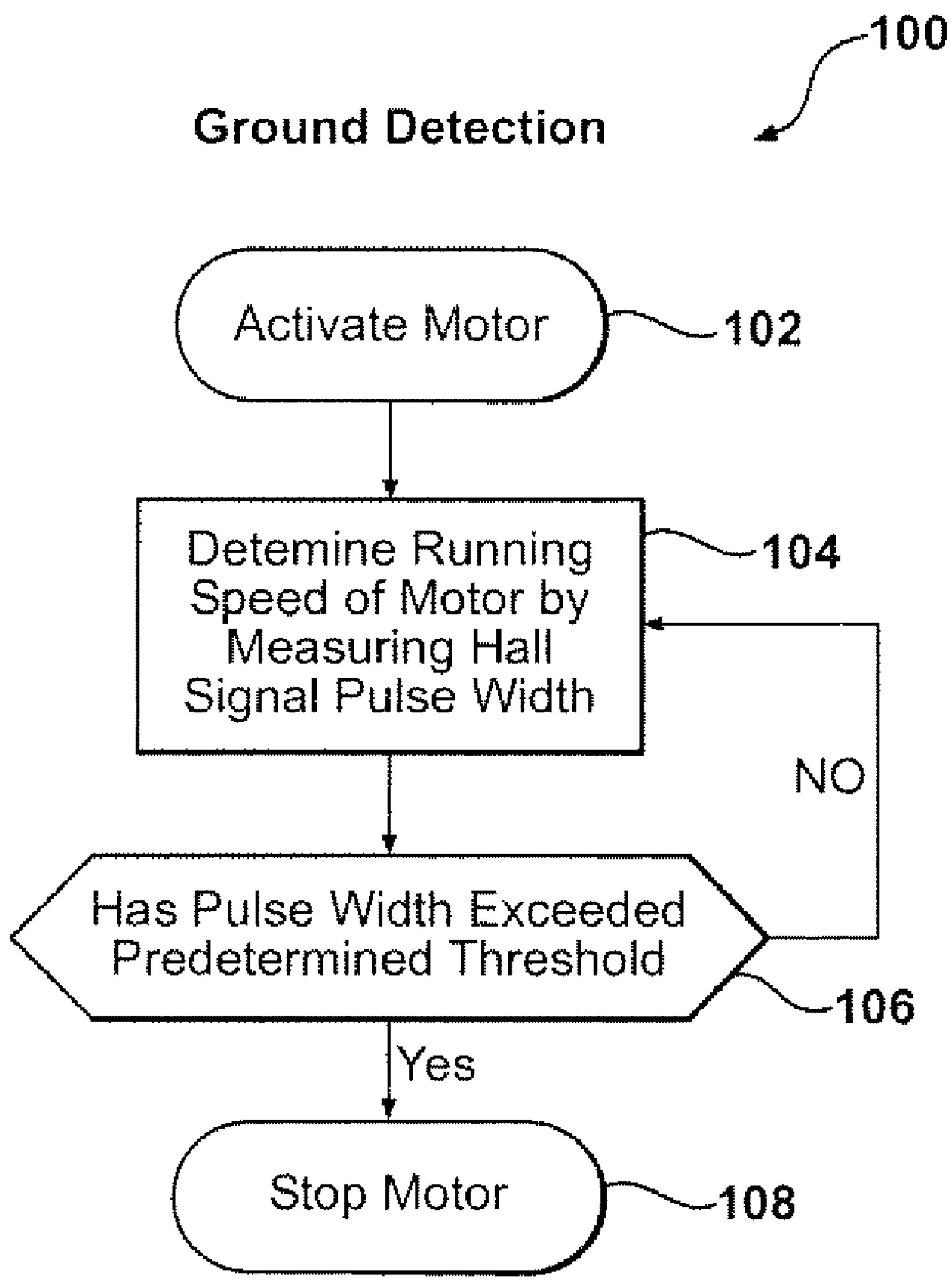
FIG. 7 is a flow-chart showing an exemplary method of detecting contact with the ground.

Another of the functions, shown in FIG. 7, includes a method of detecting contact with the ground, generally shown at 100. Although this method 100 is described with respect to the first jack assembly 24, it should be understood that all jack assemblies 24, 28, 32, 36 can perform the method of detecting contact with the ground. At step 102, the first actuator assembly 42 is activated to extend the shaft downwardly from the vehicle toward the ground. At steps 104, a rate of movement of the shaft is determined using the first integrated position sensor 44. The first electronic control unit 40 continues to monitor the rate of movement, and determines whether the rate is decreasing. If the rate of movement remains constant, then the first electronic control unit 40 continues monitoring. At step 106, the method 100 determines if the rate of movement has decreased beyond a predetermined threshold. As long as the threshold has not been exceeded, the method 100 returns to step 104 and continues monitoring the rate of movement. If the threshold has been exceeded, the method 100 proceeds to step 108, and the first electronic control unit 40 stops the first actuator assembly 42, as an indication that an end of the first shaft 26 is in contact with the ground.

As previously described, the hall effect sensor 70 of the first integrated position sensor 44 produces a pulse of current responsive to movement of the first actuator assembly 42, at step 104. Determining the rate of movement of the first shaft 26 is further described as measuring the pulse width to determine the rate. To produce the pulse of current, a magnetic field is emitted from a periodically moving member of the actuator assembly 42, such as the magnet 72 located in the gearbox 68, and changes in magnetic field density and polarity, are detected as the periodically moving member of the actuator assembly 42 changes position. Alternatively, the periodically moving member of the actuator assembly 42 could also be a reciprocating, or oscillating member, depending on the type of actuator assembly used.

Use of the integrated position sensors 44, 50, 56, 62 allows the electronic control units 40, 46, 52, 58 to determine the position of the first shaft 26 in relation to the vehicle in addition to the speed. Therefore, the electronic control units 40, 46, 52, 58 know whether the shafts 26, 30, 34, 38 are filly retracted, or whether they are partially retracted or in contact with the ground. Therefore, there is no need to provide a clutch in connection with the actuator assemblies 42, 48, 54, 60, as the electronic control units 40, 46, 52, 58 determine the precise position at which to stop the shafts 26, 30, 34, 38 to prevent damage to the actuator assemblies 42, 48, 54, 60. In addition, the leveling system electronic control unit 64 can communicate with the vehicle bus, either via the operator interface control unit 66 or directly, to perform certain functions such as to prevent the vehicle transmission from shifting the vehicle powertrain out of the "PARK" position as long as any of the shafts 26, 30, 34, 38 are not fully retracted.

Figure 8:
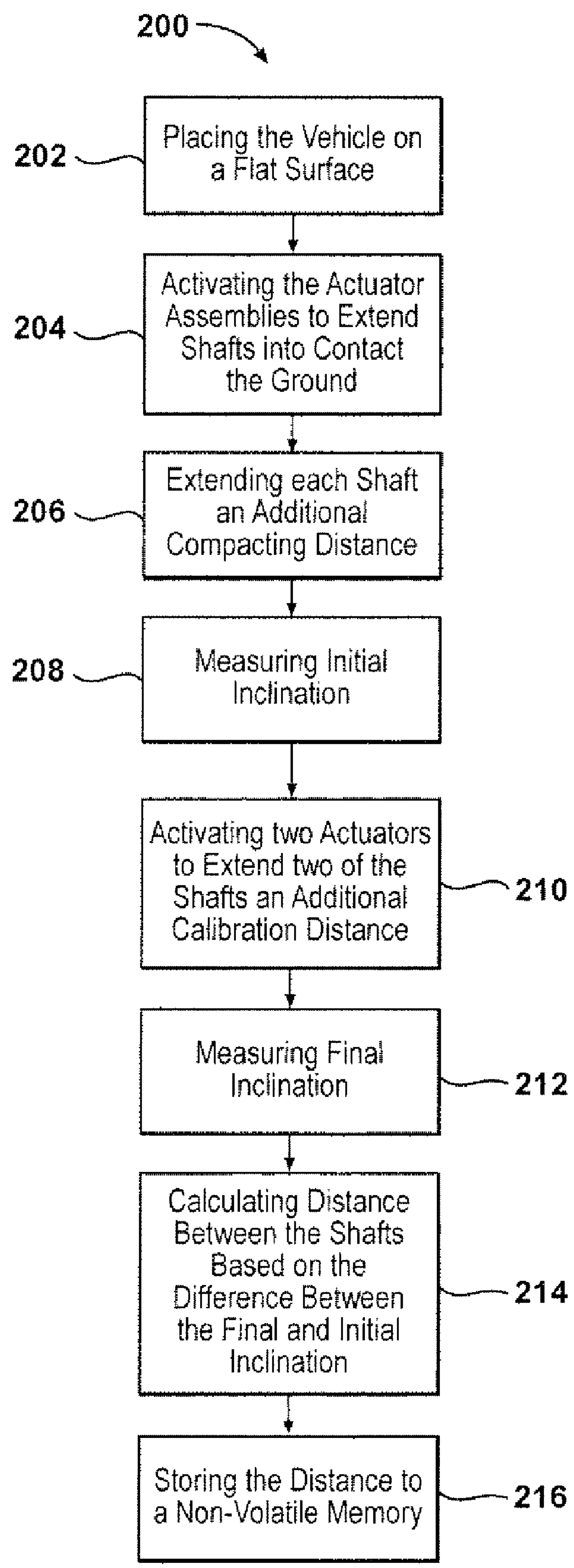
FIG. 8 is a flow-chart showing an exemplary method of calibrating the vehicle leveling assembly.

Another of the functions, shown in FIG. 8, is a method of calibrating a vehicle leveling assembly 20, generally shown at 200. In order to calibrate the vehicle leveling assembly 20, the leveling system electronic control unit 64 must know the distances in both the front-rear direction and the left-right direction between the jack assemblies 24, 28, 32, 36. This can be determined in a number of ways, including simply entering in known values for such distances. However, where such distances are not known in advance, the operator interface control unit 66, in cooperation with the leveling system electronic control unit 64, can include the method 200 of calibrating the vehicle leveling assembly 20 for calculating such distances as part of a calibration system.

At step 202, the vehicle is first moved on a flat surface. At step 204, the actuator assemblies 42, 48, 54, 60 are activated to each extend their respective shafts 26, 30, 34, 38 downwardly from the vehicle into contact with the ground. At step 206, the actuator assemblies 42, 48, 54, 60 extend each of the shafts 26, 30, 34, 38 an additional compacting distance to ensure the ground beneath each of the shafts 26, 30, 34, 38 is sufficiently compacted. This provides for a more accurate calculation as it prevents shifting of the inactive shafts 26, 30, 34, 38 during the calibration process. According to this embodiment, the additional compacting distance is approximately half an inch. At step 208, a front-rear inclination $\theta_1$ of the vehicle is measured by the inclination sensor assembly 166 to determine an initial front-rear inclination $\theta_{1i}$. At step 210, at least two of the four actuator assemblies 42, 48, 54, 60 are activated. The two assemblies correspond to the two of the four shafts 26, 30, 34, 38 positioned adjacent either a front or a rear portion of the vehicle, and extend the selected two of the four shafts 26, 30, 34, 38 downwardly a first calibration distance $Y_{1C}$. At step 212, the front-rear inclination $\theta_1$ is measured again to determine a final front-rear inclination $\theta_{1f}$. At step 214, a front-rear distance $X_1$ between the front shafts 26, 34 and the rear shafts 38, 30 is calculated according to equation (1), based on the first calibration distance $Y_{1C}$ and the difference between the final front-rear inclination $\theta_{1f}$ and the initial front-rear inclination $\theta_{1i}$:

$$X_1 = \frac{Y_{1C}}{\tan(\Theta_{1f} - \Theta_{1i})} \tag{1}$$

At step 214, the front-rear distance $X_1$ is saved into a non-volatile memory of the vehicle leveling assembly 20 for use with future calculations.

According to this embodiment, this method is carried out by the operator interface control unit 66, in cooperation with the leveling system electronic control unit 64 to read an initial front-rear inclination $\theta_{1i}$. The leveling system electronic control unit 64 activates the second and fourth jack assemblies 28, 36 and the second and fourth actuator assemblies 48, 60 to extend the second and fourth shafts 30, 38 by the first calibration distance $Y_{1C}$. According to this embodiment, the first calibration distance $Y_{1C}$ is five inches. The leveling system electronic control unit 64 checks the inclination sensor assembly 166 to read the final front-rear inclination $\theta_{1f}$. The leveling system electronic control unit 64 calculates the front-rear distance $X_1$ according to equation (1). Alternatively, the leveling system electronic control unit 64 could complete the same computation by extending the first and third jack assemblies 24, 32, instead of the second and fourth jack assemblies 28, 36.

The leveling system electronic control unit 64 conducts a similar calculation to determine the left-right distance $X_2$ between the jack assemblies 24, 28, 32, 36. First, the actuator assemblies 42, 48, 54, 60 are activated to return the vehicle to the initial front-rear inclination $\theta_{1i}$. Then, a left-right inclination $\theta_2$ of the vehicle is measured to determine an initial left-right inclination $\theta_{2i}$. Next, the selected two of the four actuator assemblies 42, 48, 54, 60 that correspond to two of the four shafts 26, 30, 34, 38 positioned laterally along either the left or right side of the vehicle are activated to extend downwardly a second calibration distance $Y_{2C}$. The left-right inclination $\theta_2$ of the vehicle is measured again to determine a final left-right inclination $\theta_{2f}$. The left-right distance $X_2$ between the left shafts 26, 30 and the right shafts 38, 34 is then calculated according to equation (2) based on the second calibration distance $Y_{2C}$ and the difference between the final and initial left-rear inclination:

$$X_2 = \frac{Y_{2C}}{\tan(\Theta_{2f} - \Theta_{2i})} \quad (2)$$

This method is also carried out by the leveling system electronic control unit 64, which communicates with the inclination sensor assembly 166 to determine the initial left-right inclination $\theta_{2i}$, and then activates the third and fourth jack assemblies 32, 36 to extend the third and fourth shafts 34, 38 by the second calibration distance $Y_{2C}$. According to this embodiment, the second calibration distance $Y_{2C}$ is five inches The leveling system electronic control unit 64 then compares the initial left-right inclination $\theta_{2i}$ to the final left-right inclination $\theta_{2f}$ and calculates the left-right distance $X_2$ according to equation (2). Alternatively, the leveling system electronic control unit 64 could complete the same computation by extending the first and second jack assemblies 24, 28, instead of the third and fourth jack assemblies 32, 36. Either way the left-right distance $X_2$ between the shafts 26, 30, 34, 38 is stored into the non-volatile memory of the vehicle leveling assembly 20.

Figure 9:
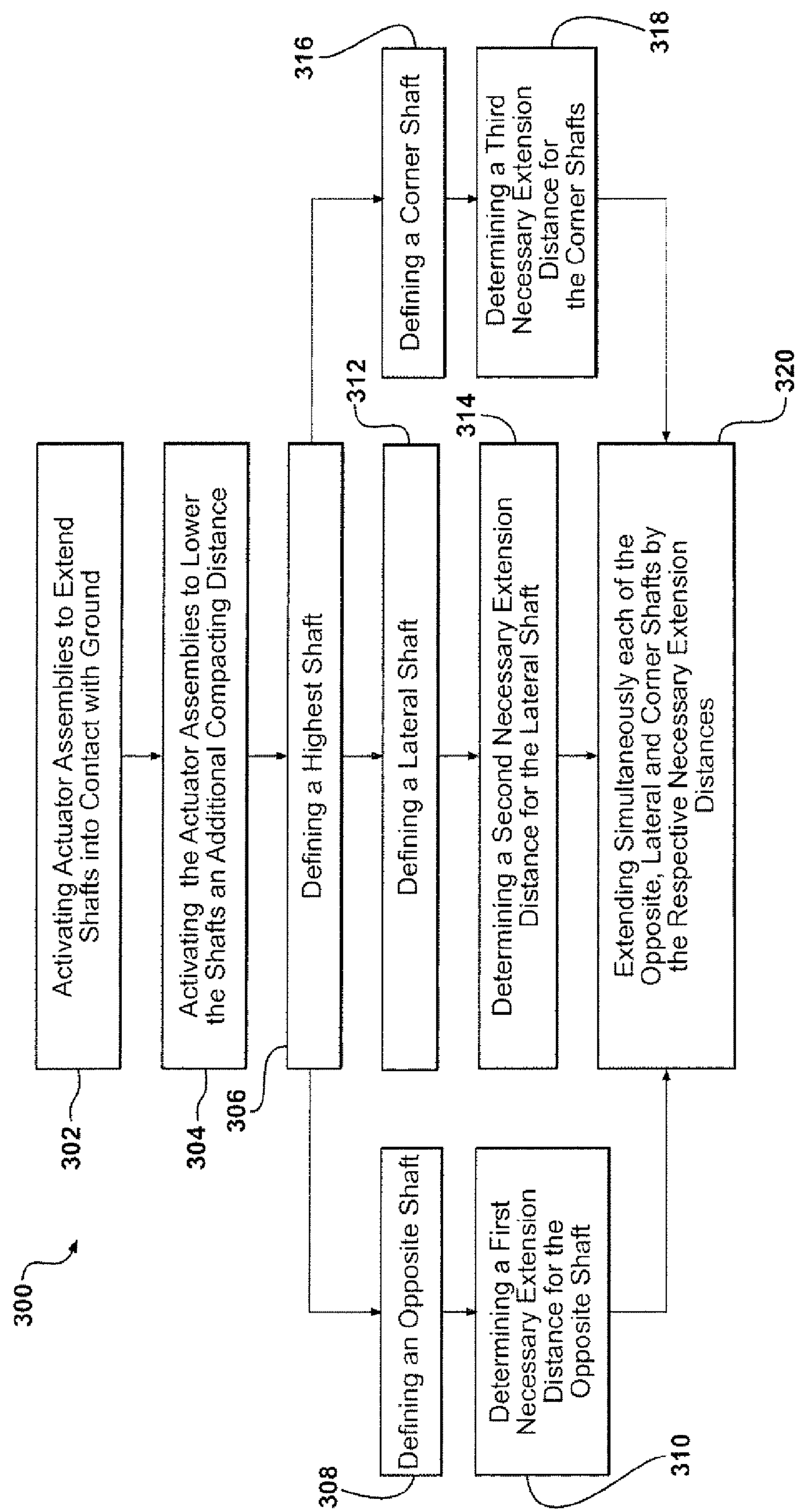
FIG. 9 is a flow-chart showing an exemplary method of leveling a vehicle.

Finally, referring to FIG. 9, the functions of the leveling system electronic control unit 64 include a method of leveling a vehicle, generally shown at 300. Upon receiving a command to begin the leveling process, the actuator assemblies 42, 48, 54, 60 are activated at step 302 to each lower the shafts 26, 30, 34, 38 downwardly into contact with the ground beneath the vehicle. At step 304 in order to eliminate shifting of the ground beneath the vehicle, the actuator assemblies 42, 48, 54, 60 are again activated to extend each shaft by an additional compacting distance. This ensures sufficient compaction of the ground so that the leveling process need not be repeated. According to this method 300, the additional compacting distance is approximately half an inch. At step 306, one of the shafts 26, 30, 34, 38 is designated as a highest shaft, corresponding to the highest corner of the vehicle, as determined by measuring the front-rear inclination $\theta_1$ and the left-right inclination $\theta_2$. At steps 308-318, for each remaining shaft other than the highest shaft, a necessary extension distance must be determined. This is the distance that the remaining shafts 26, 30, 34, 38 will be moved based on the front-rear inclination $\theta_1$ and the left-right inclination $\theta_2$ of the vehicle. The actuator assemblies 42, 48, 54, 60 corresponding to those remaining shafts 26, 30, 34, 38 are activated to move the remaining shafts 26, 30, 34, 38 the necessary extension distances, thereby leveling the vehicle.

The method 300 further includes comparing each of the necessary extension distances to an available stroke of each shaft and determining whether each shaft is available to travel the additional distance. If at least one of the additional distances is greater than the available stroke, the operator interface control unit 66 warns an operator that leveling may not be possible in this location.

This method 300 is carried out by the leveling system electronic control unit 64, by reading the output of the inclination sensor assembly 166. By receiving the front-rear inclination $\theta_1$ and the left-right inclination $\theta_2$, the leveling system electronic control unit 64 is able to communicate with the electronic control units 40, 46, 52, 58 to designate one of the four shafts 26, 30, 34, 38 as a highest shaft. The highest shaft is the shaft corresponding to the highest elevation of the vehicle, and therefore will have to be adjusted the least, with the other three of the four shafts 26, 30, 34, 38 adjusting to bring the other three corners of the vehicle up. At step 308, the shaft on the same left-right side of the highest shaft and at the opposite end of the vehicle in a front-rear direction is designated as an opposite shaft. At step 310, the leveling system electronic control unit 64 calculates a first necessary extension $Y_1$ of the opposite shaft according to equation (3) based on the stored value of the front-rear distance $X_1$ between the shafts 26, 30, 34, 38 and the front-rear inclination $\theta_1$ as retrieved from the inclination sensor assembly 166:

$$Y_1 = X_1 \tan \Theta_1 \quad (3)$$

At step 312, the shaft across from the highest shaft in a left-right direction, and at the same end in the front-rear direction, is designated as a lateral shaft. At step 314, the leveling system electronic control unit 64 calculates a second necessary extension $Y_2$ of the lateral shaft according to equation (4) based on the stored value of the left-right distance $X_2$ between the shafts 26, 30, 34, 38 and the left-right inclination $\theta_2$ as retrieved from the inclination sensor assembly 166:

$$Y_2 = X_2 \tan \Theta_2 \quad (4)$$

At step 316, the remaining shaft, located both across from the highest shaft and at the opposite end of the vehicle, is designated as a corner shaft. At step 318, the leveling system electronic control unit 64 calculates a third necessary extension $Y_3$ of the corner shaft according to the equation (5) based on the values of the first and second necessary extensions $Y_1$, $Y_2$:

$$Y_3 = Y_1 + Y_2 \quad (5)$$

At step 320, once the necessary extensions have been calculated, the leveling system electronic control unit 64 instructs the electronic control units 40, 46, 52, 58, and in turn the actuator assemblies 42, 48, 54, 60, to activate their respective shafts 26, 30, 34, 38 to extend precisely the required distance. In addition, due to the additional step of extending the shafts 26, 30, 34, 38 the additional compacting distance, this adjustment only needs to be made once, rather than repeating the process several times to achieve the desired attitude.

Obviously, many modifications and variations of the present invention are possible in light of the above teachings and may be practiced otherwise than as specifically described while within the scope of the appended claims.

What is claimed is:

1. A vehicle leveling assembly comprising:

a plurality of jack assemblies for attachment to a vehicle structure, each of said jack assemblies including a shaft extending along an axis and an actuator assembly for translating said shaft along said axis, and said jack assemblies including a position sensor for measuring a rate of movement of said shaft along said axis and an electronic control unit for receiving the rate of movement of said shaft, said electronic control unit is in communication with said position sensor for detecting a signal emitted by said position sensor to determine a current position of said shaft and wherein said electronic control unit is configured to measure the width of pulses emitted by said position sensor to determine the rate of movement of said shaft and said electronic control unit is in communication with said actuator assembly for stopping said actuator assembly when the rate of movement decreases to indicate contact between the shaft and the ground.

2. An assembly as set forth in claim 1 wherein said actuator assemblies are independently responsive to said electronic control units.

3. An assembly as set forth in claim 2 wherein said position sensor is a hall effect sensor and said position sensor further includes a magnet in proximity to said hall effect sensor for producing a signal in response to movement of said magnet.

4. An assembly as set forth in claim 2 wherein said position sensor includes a commutator pulse detection circuit.

5. An assembly as set forth in claim 1 wherein said actuator assembly includes an electric motor having rotational motion and a gearbox having a plurality of gears for converting rotational motion of the electric motor into linear motion.

6. An assembly as set forth in claim 5 wherein said actuator assembly includes a rotating shaft and wherein a magnet surrounds and rotates with said rotating shaft and wherein said position sensor is connected to said actuator assembly for producing the signal in response to rotation of said magnet.

7. An assembly as set forth in claim 1 wherein said jack assemblies include a first jack assembly having a first electronic control unit and a first actuator assembly and a first shaft for attachment to a vehicle structure in a first quadrant thereof and a second jack assembly having a second electronic control unit and a second actuator assembly and a second shaft for attachment to the vehicle structure in a second quadrant thereof and disposed rearwardly of the first quadrant and a third jack assembly having a third electronic control unit and a third actuator assembly and a third shaft for attachment to the vehicle structure in a third quadrant thereof and disposed rightwardly of the first quadrant and a fourth jack assembly having a fourth electronic control unit and a fourth actuator assembly and a fourth shaft for attachment to the vehicle structure in a fourth quadrant thereof and disposed rightwardly of the second quadrant and rearwardly of the third quadrant.

8. An assembly as set forth in claim 7 including a leveling system electronic control unit for attachment to the vehicle and for determining a front-rear inclination of the vehicle and for determining a left-right inclination of the vehicle.

9. An assembly as set forth in claim 8 wherein said second and fourth electronic control units are in communication with said leveling system electronic control unit for receiving a command based on the front-rear inclination and are configured to activate said second and fourth actuator assemblies to extend said second and fourth shafts by a first calibration distance for calculating a front-rear distance between said first jack assembly and said second jack assembly according to the equation $$X_1 = \frac{Y_{1C}}{\tan(\Theta_{1f} - \Theta_{1i})}$$

wherein, $Y_{1C}$ is the first calibration distance by which the second and fourth shafts are extended, $\theta_{1i}$ is an initial front-rear inclination determined prior to activating said actuator assemblies to extend said second and fourth shafts, and $\theta_{1f}$ is the final front-rear inclination determined after activating said actuator assemblies to extend said second and forth shafts.

10. An assembly as set forth in claim 8 wherein said first and third electronic control units are in communication with said leveling system electronic control unit for receiving a command based on the front-rear inclination and are configured to activate said first and third actuator assemblies to extend said first and third shafts by a first calibration distance for calculating a front-rear distance between said first jack assembly and said second jack assembly according to the equation $$X_1 = \frac{Y_{1C}}{\tan(\Theta_{1f} - \Theta_{1i})}$$

wherein, $Y_{1C}$ is the first calibration distance by which the second and fourth shafts are extended, $\theta_{1i}$ is an initial front-rear inclination determined prior to activating said actuator assemblies to extend said second and fourth shafts, and $\theta_{1f}$ is the final front-rear inclination determined after activating said actuator assemblies to extend said second and forth shafts.

11. An assembly as set forth in claim 8 wherein said third and fourth electronic control units are in communication with said leveling system electronic control unit for receiving a command based on the left-right inclination and are configured to activate said third and fourth actuator assemblies to extend said third and fourth shafts by a second calibration distance for calculating a left-right distance between said first jack assembly and said third jack assembly according to the equation $$X_2 = \frac{Y_{2C}}{\tan(\Theta_{2f} - \Theta_{2i})}$$

wherein, $Y_{2C}$ is the second calibration distance by which the third and fourth shafts are extended, $\theta_{2i}$ is an initial left-right inclination determined prior to activating said actuator assemblies to extend said third and fourth shafts, and $\theta_{2f}$ is a final left-right inclination determined after activating said actuator assemblies to extend said third and fourth shafts.

12. An assembly as set forth in claim 8 wherein said first and second electronic control units are in communication with said leveling system electronic control unit for receiving a command based on the left-right inclination and are configured to activate said first and second actuator assemblies to extend said first and second shafts by a second calibration distance for calculating a left-right distance between said first jack assembly and said third jack assembly according to the equation $$X_2 = \frac{Y_{2C}}{\tan(\Theta_{2f} - \Theta_{2i})}$$

wherein, $Y_{2C}$ is the second calibration distance by which the third and fourth shafts are extended, $\theta_{2i}$ is an initial left-right inclination determined prior to activating said actuator assemblies to extend said third and fourth shafts, and $\theta_{2f}$ is a final left-right inclination determined after activating said actuator assemblies to extend said third and fourth shafts.

13. An assembly as set forth in claim 8 wherein said electronic control units are in communication with said leveling system electronic control unit for receiving a command based on the front-rear inclination and the left-right inclination and said electronic control units being configured to designate one of said four shafts as a highest shaft based on the front-rear and left-right inclinations and to designate another of said four shafts at an opposite end of the vehicle in the front-rear direction as an opposite shaft and to calculate a first necessary extension of said opposite shaft according to the equation $Y_1=X_1 \tan \Theta_1$ wherein, $X_1$ is a front-rear distance between the highest shaft and the opposite shaft along the front-rear direction, $\theta_1$ is the front-rear inclination determined by said leveling system electronic control unit, and said electronic control units being configured to designate another of said four shafts across from said highest shaft in a left-right direction as a lateral shaft and to calculate a second necessary extension of said lateral shaft according to the equation $Y_2=X_2 \tan \Theta_2$ wherein, $X_2$ is a left-right distance between the highest shaft and the lateral shaft along the left-right direction, $\theta_2$ is the left-right inclination determine by said leveling system electronic control unit, and said electronic control units being configured to designate a last of said four shafts as a corner shaft and to calculate a third necessary extension of said corner shaft according to the equation $Y_3=Y_1+Y_2$.

14. An assembly as set forth in claim 8 including an operator interface electronic control unit in communication with said electronic control units of said jack assemblies through said leveling system electronic control unit for receiving and transmitting instructions from an operator.

15. An assembly as set forth in claim 14 wherein said operator interface electronic control unit includes a display and a plurality of soft-keys for permitting an operator to select from a plurality of functions provided by a label adjacent to one of the soft-keys on said liquid-crystal display.

16. An assembly as set forth in claim 15 wherein said operator interface electronic control unit is configured to redefine the functions associated with the soft-keys when tasks associated with said operator interface electronic control unit change.

17. An assembly as set forth in claim 14 wherein said operator interface electronic control unit is in communication with said leveling system electronic control unit through a serial interface.

18. An assembly as set forth in claim 17 wherein said operator interface electronic control unit includes a connection for communication with a vehicle bus and said operation interface control unit is configured to receive a vehicle status signals.

19. An assembly as set forth in claim 18 wherein said operator interface electronic control unit receives the vehicle status signals from the vehicle bus.

20. An assembly as set forth in claim 18 wherein said operator interface electronic control unit receives the vehicle status signals from hardwire signals.

21. An assembly as set forth in claim 18 wherein said operator interface electronic control unit receives the vehicle status signals from a combination of a vehicle bus and hardwire signals.

* * * * *